(12) United States Patent
Wallrabenstein (10) Patent No.: US 10,999,082 B2
(45) Date of Patent: May 4, 2021

(54) LOCALIZED GARBLED CIRCUIT DEVICE (71) Applicant: Analog Devices, Inc., Norwood, MA (US)

(72) Inventor: John Ross Wallrabenstein, West Lafayette, IN (US)

(73) Assignee: Analog Devices, Inc., Wilmington, MA (US)

(*) Notice: Subject to any disclaimer, the term of this patent is extended or adjusted under 35 U.S.C. 154(b) by 263 days.

(21) Appl. No.: 16/145,624

(22) Filed: Sep. 28, 2018

(65) Prior Publication Data
US 2020/0106626 A1 Apr. 2, 2020

(51) Int. Cl.
G06F 21/72 (2013.01)
H04L 9/32 (2006.01)
H04L 9/08 (2006.01)

(52) U.S. Cl.
CPC ............ H04L 9/3278 (2013.01); G06F 21/72 (2013.01); H04L 9/0861 (2013.01); H04L 2209/12 (2013.01)

(58) Field of Classification Search
CPC .... G06F 21/72; G06F 21/70–74; G06F 21/75; H04L 9/3278; H04L 9/0866; H04L 2209/12; H04L 9/0861; H04L 9/0822
See application file for complete search history.

(56) References Cited

U.S. PATENT DOCUMENTS

| | | | |
|---|---|---|---|
| 8,683,204 B2 | 3/2014 | Kolesnikov | |
| 8,891,766 B2 | 11/2014 | Kolesnikov | |
| 8,918,647 B1 | 12/2014 | Wallrabenstein | |
| 9,292,692 B2 | 3/2016 | Wallrabenstein | |
| 9,401,804 B2 | 7/2016 | Kolesnikov et al. | |
| 9,672,342 B2 | 6/2017 | Walsh et al. | |
| 9,715,590 B2 | 7/2017 | Gardner et al. | |

(Continued)

FOREIGN PATENT DOCUMENTS

WO   WO 2017/017501 A1   2/2017

OTHER PUBLICATIONS

U.S. Appl. No. 15/807,255, filed Nov. 8, 2017, Wallrabenstein.
(Continued)

*Primary Examiner* — Olugbenga O Idowu
(74) *Attorney, Agent, or Firm* — Wolf, Greenfield & Sacks, P.C.

(57) ABSTRACT

According to various aspects of the present application, systems and methods are provided for implementing a garbled circuit on a device. Doing so allows the device to perform computations while protecting the computations from being observed or accessed by an adversarial entity. A garbled circuit involves two parties, known as the generator and the evaluator, jointly evaluating a function. Conventionally, a garbled circuit is executed on two different devices in order for the two different parties to jointly calculate the function without each party revealing to the other party private information such as input values to the function. Some embodiments provide for execution of the garbled circuit on a single device by implementing both parties on the device as separate processes. Some embodiments prevent an adversarial entity with physical access to the device from being able to observe calculations performed by the device to evaluate a function.

20 Claims, 3 Drawing Sheets

(56) References Cited

U.S. PATENT DOCUMENTS

| | | |
|---|---|---|
| 9,806,718 B2 | 10/2017 | Wallrabenstein |
| 9,946,858 B2 | 4/2018 | Wallrabenstein |
| 9,996,480 B2 | 6/2018 | Walsh et al. |
| 9,998,445 B2 | 6/2018 | Wallrabenstein |
| 10,013,543 B2 | 7/2018 | Walsh et al. |
| 2009/0175443 A1 | 7/2009 | Kolesnikov et al. |
| 2015/0134966 A1 | 5/2015 | Wallrabenstein |
| 2015/0317480 A1 | 11/2015 | Gardner et al. |
| 2015/0317481 A1 | 11/2015 | Gardner et al. |
| 2015/0318994 A1 | 11/2015 | Walsh et al. |
| 2015/0341792 A1 | 11/2015 | Walsh et al. |
| 2016/0004874 A1 | 1/2016 | Ioannidis et al. |
| 2016/0021096 A1 | 1/2016 | Wallrabenstein |
| 2016/0170907 A1 | 6/2016 | Walsh et al. |
| 2016/0269186 A1 | 9/2016 | Wallrabenstein |
| 2017/0063559 A1 | 3/2017 | Wallrabenstein |
| 2017/0149572 A1 | 5/2017 | Wallrabenstein |
| 2017/0270288 A1 | 9/2017 | Walsh et al. |
| 2018/0248706 A1 | 8/2018 | Wallrabenstein |
| 2018/0351752 A1 | 12/2018 | Wallrabenstein et al. |
| 2018/0351753 A1 | 12/2018 | Wallrabenstein et al. |
| 2018/0351754 A1 | 12/2018 | Wallrabenstein et al. |
| 2020/0051062 A1* | 2/2020 | Wade .................. H04L 9/3278 |

OTHER PUBLICATIONS

U.S. Appl. No. 15/968,496, filed May 1, 2018, Adams et al.
U.S. Appl. No. 15/968,513, filed May 1, 2018, Adams et al.
U.S. Appl. No. 16/145,624, filed Sep. 28, 2018, Wallrabenstein.
Bommakanti, Reusable Garbled Circuit Implementation of AES to Avoid Power Analysis Attacks. All Theses. Clemson University. TigerPrints. 2017;2751. 65 pages.
Carter et al., Secure Outsourced Garbled Circuit Evaluation for Mobile Devices. Semantic Scholar. 2016; p. 1-16.
Schneider, Engineering Secure Two-Party Computation Protocols. Dissertation. Ruhr Universität Bochum. Feb. 9, 2011; 163 pages.

* cited by examiner

LOCALIZED GARBLED CIRCUIT DEVICE

FIELD OF THE DISCLOSURE

The present disclosure relates to systems and techniques for using a garbled circuit to evaluate a function.

BACKGROUND

A physical unclonable function (PUF) may generate an output value based on its physical properties. Tampering with the PUF typically alters its physical properties. As a result, the PUF output value for a given input value may be modified.

SUMMARY OF THE DISCLOSURE

According to various aspects of the present application, systems and methods are provided for implementing a garbled circuit on a device. Doing so allows the device to evaluate a function while protecting the evaluation from being observed or accessed by an adversarial entity. A garbled circuit involves two parties, known as the generator and the evaluator, jointly evaluating a function. Conventionally, a garbled circuit is executed on two different devices in order for the two different parties to jointly calculate the function without each party revealing to the other party private information such as input values to the function. Some embodiments provide for execution of the garbled circuit on a single device by implementing both parties on the device as separate processes. Some embodiments prevent an adversarial entity with physical access to the device from being able to observe calculations performed by the device to evaluate a function.

According to one aspect, a security device is provided. The security device comprises: a housing; a processor disposed in the housing, the processor configured to implement a garbled circuit; and a tamper resistant module connected to the single processor, the tamper resistant module configured to generate an output value based on tamper-dependent physical characteristics of the tamper resistant module.

According to another aspect, a method implemented in a self-contained security device is provided. The method comprises implementing, by a processor within the security device, a garbled circuit.

According to another aspect, a security device is provided. The security devices comprises: a housing; processing circuitry disposed in the housing and configured to implement a garbled circuit.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

A garbled circuit is a cryptographic protocol or scheme that may be used to evaluate a function securely such that an external entity is unable to access all of the input values of the function, or to access intermediate values generated during evaluation of the function. To implement a garbled circuit, typically two separate parties jointly evaluate the function. The two parties are known as (1) the "generator" or "garbler," and (2) the "evaluator." The generator and evaluator each provides an input value to the function. The input value of each party remains private to the respective party, meaning that the other party does not see the input value. The generator encrypts a mapping of input values of a function to corresponding output values of the function. For example, the function may be represented as one or more Boolean functions which receive bit values as input. The mapping may be all or a portion of truth table(s) that specify output value(s) of the Boolean function(s) that result from combinations of generator and evaluator input values. A truth table may also be referred to as a "Boolean circuit." The generator transmits the encrypted mapping to the evaluator. The evaluator uses the encrypted mapping to obtain an output value of the function based on the input values provided by the generator and the evaluator.

In a conventional garbled circuit implementation, the generator and evaluator are implemented on separate devices. The generator and evaluator may use a garbled circuit to jointly evaluate a function without revealing private information such as input values to each other. An adversarial entity may only access or observe the entire evaluation of the function by infiltrating both the device implementing the generator, and the device implementing the evaluator. Thus the adversarial entity cannot learn how the function is being evaluated without infiltrating both of the devices (e.g., by accessing registers and/or memory of the devices). For example, two different healthcare facilities may need to calculate statistics about their combined body of patients. However, each of the two healthcare facilities may be unable to share information about its patients outside of a computer system (e.g., electronic medical record system) of the healthcare facility in order to maintain patient privacy. A garbled circuit may be implemented by the two health care facility computer systems to jointly calculate the statistics without each health care facility computer system revealing its patient information to the other health care facility system. In another example, multiple different financial institutions (e.g., banks) may need to determine a sum of money across accounts at each of the different institutions. A garbled circuit may be implemented by different computer systems of the institutions to calculate the sum of the money in the accounts, without any of the computer systems revealing a balance of an account at the institution.

The inventors have recognized that conventional garbled circuit implementations are limited to scenarios involving mutually distrustful parties, in which functions take multiple inputs from multiple different devices or system. The security provided by conventional implementation relies on the fact that an adversarial entity would have to infiltrate each of the multiple devices to access all the input values to a function, and/or intermediate steps of evaluating the function. Conventional garbled circuit implementations are not implemented on a single device and do not provide security for functions evaluated by a single device as an adversarial entity could access the input values to the function, and/or results of intermediate steps of the function by infiltrating the single device. For example, if a single device were to use a conventional garbled circuit implementation to calculate a sum of values, an adversarial entity could gain access to the individual values, and the summation calculations implemented by the device by determining one or more cryptographic keys used by the single device to implement the garbled circuit.

The inventors have developed systems and techniques by which a garbled circuit may be implemented or executed on a single device while still preventing external entity observation of or access to evaluation of a function if the device is infiltrated, contrary to conventional garbled circuit technology. For example, an external entity that gains access to registers or memory of the device may be prevented from observing or accessing calculations performed by the device to evaluate the function. The device may be considered a self-contained device, or a localized garbled circuit device, rather than using multiple distinct devices as with conventional garbled circuits. By allowing a single device to implement a garbled circuit, systems and techniques described herein expand the set of functions which can be implemented and secured using garbled circuits. Unlike conventional garbled circuit implementations, functions which can be protected by using a garbled circuit according to aspects of the present application are not limited to those that require multiple inputs from multiple different entities. Some embodiments allow any function which can be represented as one or more Boolean functions (e.g., AND, or NOT operations, and any combination thereof) to be implemented using a garbled circuit. In one example implementation, a single mobile device may implement a garbled circuit to execute an algorithm for calculating GPS coordinates. The garbled circuit may prevent an adversarial entity from accessing input values used in the algorithm, and resulting values of intermediate steps of the algorithm. In another example implementation, a medical device such as an MRI machine may implement a garbled circuit to calculate a frequency of an excitation to pulse to apply based on values received from one or more sensors of the MRI machine. The garbled circuit implementation may prevent an adversarial entity from accessing the values provided by the sensor(s) or resulting values of intermediate steps of the calculation.

To implement the garbled circuit on a single device, the device may implement both the generator and evaluator of the garbled circuit. The generator and evaluator may be implemented as separate software modules on the device rather than being implemented on distinct devices. One or more keys, secrets, or portions thereof used by the device to implement the garbled circuit are secured such that infiltrating the device will not allow an external entity to observe or access evaluation of a function. According to an aspect of the present application, a garbled circuit is implemented on a single device using a single key or secret, contrary to conventional garbled circuit implementations which require multiple devices each of which maintains a separate key or secret. Systems and techniques described herein may protect the single key from being used to observe or access evaluation of a function. According to another aspect of the present application, a garbled circuit is implemented on a single device using multiple keys or secrets. For example, each of the generator and evaluator may use a separate key in the garbled circuit implementation.

Some embodiments use a Physical Unclonable Function (PUF) to allow the device to implement both the generator and the evaluator on the device while still preventing an external entity from observing or accessing evaluation of a function by infiltrating the single device. The generator and evaluator access private information such as respective input values in encrypted form. For example, the private information may include input values of a function that the device is to evaluate. The private information may be encrypted using secret information such as a key, secret, or share thereof generated by the PUF. The generator and evaluator obtain secret information (e.g., a key) from the PUF to decrypt the private information. If an external entity were to tamper with the device, the physical properties of the PUF would be modified making the PUF unable to generate correct secret information, and thus prevent the generator and/or evaluator from decrypting private information such as input values of the function. Without access to the private information (e.g., input values of the function), the device would be unable to complete evaluation of the function. As a result, the external entity would be unable to observe or access evaluation of the function. Thus, according to aspects of the present application, a garbled circuit is implemented on a single, self-contained device, and the key(s) used in implementing the garbled circuit are secured using a PUF.

Figure 1A:
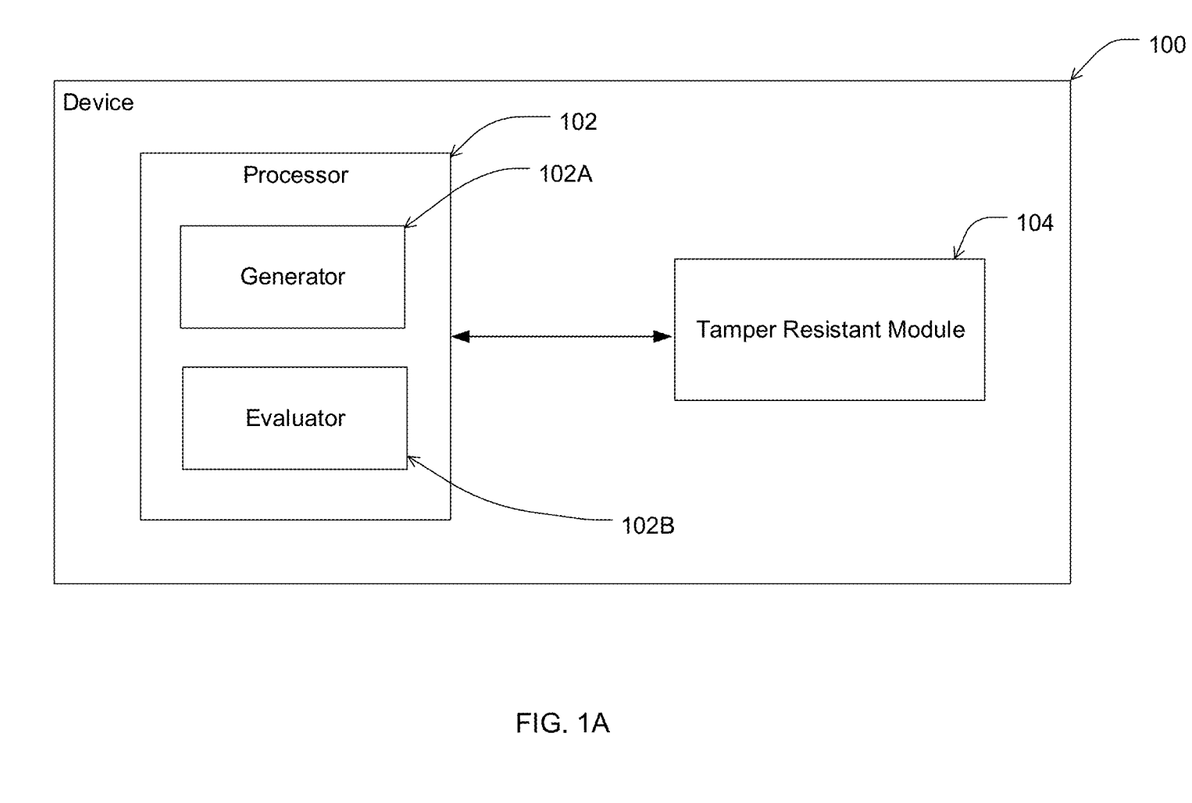
FIG. 1A shows a block diagram of an embodiment of a device configured to implement a garbled circuit, according to a non-limiting embodiment of the present application.

FIG. 1A illustrates a block diagram of a device 100 that is configured to implement or execute a garbled circuit, according to some embodiments of the application. The device 100 includes a processor 102, and a tamper resistant module 104. The processor 102 implements or executes the garbled circuit. As illustrated in FIG. 1A, the processor 102 implements both the generator 102A and the evaluator 102B of the garbled circuit. The tamper resistant module 104 may be configured to generate an output value based on tamper-dependent physical properties of the tamper resistant module 104.

In some embodiments, the processor 102 may be configured to implement operations of the generator 102A and the evaluator 102B sequentially. For example, the processor 102 may be configured to activate the generator 102A to perform a first set of operations, and then de-activate the generator 102A. The processor 102 may be configured to activate the evaluator 102B to perform a second set of operations after performing the first set of operations associated with the generator 102A. In some embodiments, to exchange information between the generator 102A and the evaluator 102B, the processor 102 may be configured to store information in memory. For example, the processor 102 may activate the generator 102A to determine one of multiple input values for a function, and construct an encrypted mapping based on the determined input. The processor 102 may then activate the evaluator 102B, which can access the encrypted mapping stored in the memory to execute one or more operations for evaluating the function.

In some embodiments, the tamper resistant module 104 comprises a physical unclonable function (PUF) that generates an output value based on physical properties of the PUF. The tamper resistant module 104 may also be referred to as a "hardware root of trust." For example, the PUF may comprise a chip which includes electrical circuits. Variations in manufacturing processes and parts may give the electrical circuits of the chip unique hardware characteristics. The PUF may be configured to generate an output value based on the unique hardware characteristics specific to the electrical circuits. The variations that give the PUF its unique hardware characteristics are uncontrollable during manufacturing making it impractical, and in some embodiments impossible, to duplicate the structure of the PUF. In some embodiments, the PUF provides the device 100 with a unique hardware-based identity.

In some embodiments, the PUF may be configured to generate an output value based on an input value. For example, in response to receiving an input value, the PUF may generate an output value based on unique hardware properties of the PUF and the input value. In some embodiments, the input value may comprise a challenge. For example, the challenge may comprise a set of one or more bits that are inputted in to the PUF. The PUF may be configured to generate a response in response to receiving the set of input bit(s). The generated PUF response is based on the challenge and the unique hardware characteristics of the PUF.

In some embodiments, the PUF may be configured to generate an output value without receiving an input value. For example, a static random access memory (SRAM) PUF may be configured to generate an output value based on the state of memory bits. An SRAM includes a number of SRAM cells. Each SRAM cell has a preferred state every time that the SRAM is powered on. The preferred state of each SRAM cell is based on random variations that occurred during manufacturing of the SRAM memory. By requesting the state of the memory bits at a memory address or addresses, the SRAM PUF generates a unique value which may be used for encoding secret information (e.g., a key, or shares of a key). In some embodiment, the unique value may comprise a random bit pattern. To extract the unique value from the SRAM PUF, the SRAM PUF may be powered on to read out the unique value from the SRAM PUF when the unique value is needed for generation of secret information.

In some embodiments, an output value of the PUF may be noisy and vary slightly across multiple evaluations of a consistent input value. In some embodiments, the PUF may comprise a fuzzy extractor to generate an output value that is constant for a constant input value. For example, fuzzy extraction can be implemented using error correction code (ECC) and helper data to recover a constant value for a fixed input value to the PUF. Algorithm 1 below illustrates an example algorithm to generate the helper value or string.

---
Algorithm 1 Gen Algorithm
---

Input : A finite field $\mathbb{F}_n$ of order n; A challenge c
O ← PUF(c)
V ∈ $\mathbb{F}_n$
P ← O ⊕ ECC(V)
return (V, P)

---

In Algorithm 1 above, the PUF generates a response $O$ to a challenge c. Next, the PUF generates a random k-bit value V that is to be reconstructed at a subsequent time in response to receiving the challenge c. Next, the PUF generates a helper data (e.g., a string) P as the output of O xor ECC(V). ECC can, for example, comprise a binary (n, k, 2t+1) error correcting code of length n capable of correcting t errors. Algorithm 2 below illustrates an example of how the helper data P may be used to recover the value V using the PUF.

---
Algorithm 2 Rep Algorithm
---

Input : A challenge c, Helper string P
O' ← PUF(c)
V ← D(P ⊕ O')
return V

---

In Algorithm 2 above, the helper data (e.g., generated by executing Algorithm 1) is used to recover V when the PUF receives challenge c. The PUF first generates a response O' to challenge c. The response O' may be slightly different than the response O generated in Algorithm 1. The PUF can then recover V using decoding scheme D corresponding to the correction code ECC used in Algorithm 1. In some embodiments, the value V can be recovered using the helper string P and the decoding scheme D when O' is within a distance t of O. In some embodiments, the distance t may comprise a number of differences between two strings of equal length.

In some embodiments, tampering with the PUF may change physical characteristics of the PUF. The PUF may be configured to enroll secret information. The secret information may comprise a key or secret, or shares thereof. The PUF may be configured to regenerate or recover the secret information in order for the device 100 to perform one or more operations. In some embodiments, the processor 102 may trigger regeneration of the secret information to use for decrypting and/or encrypting information used in executing the garbled circuit. For example, the processor 102 may use the secret information to (1) decrypt a received encrypted input value to a function, (2) encrypt an input value to the function, (3) encrypt possible output values of the function, and/or (4) decrypt one or more encrypted output values. If the PUF is tampered with, the physical properties of the PUF change. As a result, the PUF will be unable to regenerate previously enrolled secret information and, in turn, prevent completion of subsequent operations that require use of the secret information for execution.

Figure 1B:
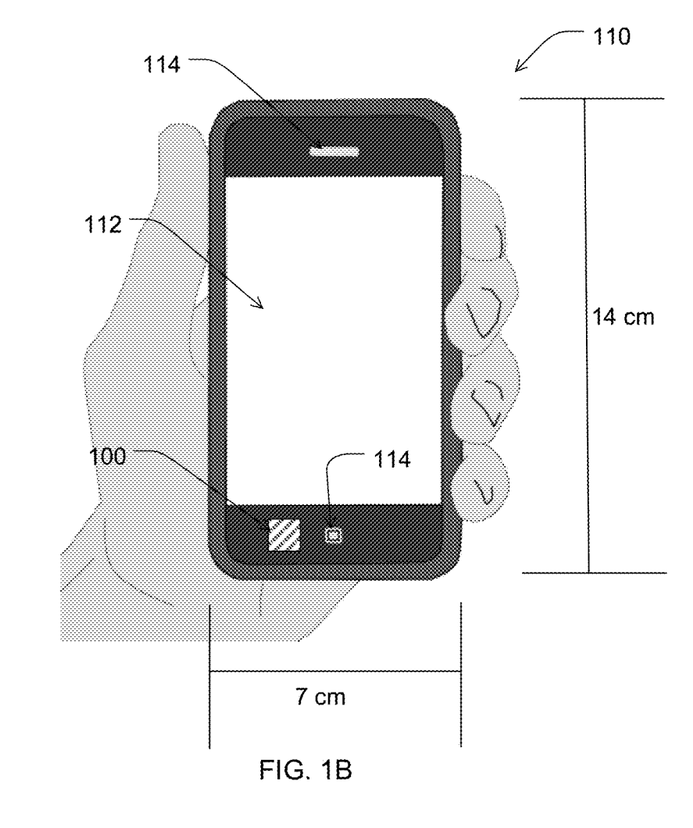
FIG. 1B shows a non-limiting example implementation of the device in FIG. 1A.

The device 100 of FIG. 1A may take various forms when implemented. For example, the device 100 may form or be part of a mobile device, a laptop computer, a desktop computer, a server, or other devices which execute functions desired to be kept safe from tampering. FIG. 1B shows a mobile device 110 which is a non-limiting example of device 100. For example, the processor 102 of the device 100 may be a processor of the mobile device 110 for performing computations. In some embodiments, the tamper resistant module 104 may be a component of the mobile device 110. The processor 102 may be communicatively coupled with the tamper resistant module 104 in the mobile device 110. The mobile device 110 may be configured to implement a garbled circuit to evaluate one or more functions during operation of the mobile device 110.

The mobile device 110 includes a screen 112. The screen 112 may be configured to display information, and user interface screens. The screen 112 may also provide an interactive interface by which the user can interact with the mobile device 110. For example, the screen 112 may be a touch screen that the user can interact with (e.g., by tapping, swiping, holding). The mobile device 110 may be configured to communicate with one or more other systems. The mobile device 110 also includes an ear piece 114 via which a user may listen to sound signals received from another system. The mobile device 110 may also include one or more buttons such as button 114 via which the mobile device 110 received input from a user of the device 110. In some embodiments, the mobile device 110 may be configured to perform one or more operations in response to detecting a touch of the button 114.

In some embodiments, the mobile device 110 may be configured to implement a garbled circuit. The mobile device 110 may be configured to implement a garbled circuit to evaluate one or more functions. For example, the mobile device 110 may implement a garbled circuit to calculate GPS coordinates based on one or more input values received from one or more sensors inside the mobile device 110. By implementing the garbled circuit, the mobile device 110 may prevent an external entity from observing input values from the sensor(s) and/or observing intermediate steps of an algorithm used for calculating the GPS coordinates. In another example, the mobile device 110 may implement a garbled circuit to execute an algorithm for identifying a tower that a radio communication unit of the mobile device 110 is to connect to. The mobile device 110 may implement the garbled circuit to prevent an external entity from observing input values used to identify the tower and/or observing intermediate steps of an algorithm used for identifying the tower.

As described above, the embodiments described herein are not limited to implementation in a mobile device 110. The device 100 may be implemented as or part of any computing device including smart phones, desktop computers, laptop computers, tablets, servers, and/or other devices. Some embodiments may be implemented on a chip for a system on chip (SoC).

Figure 2:
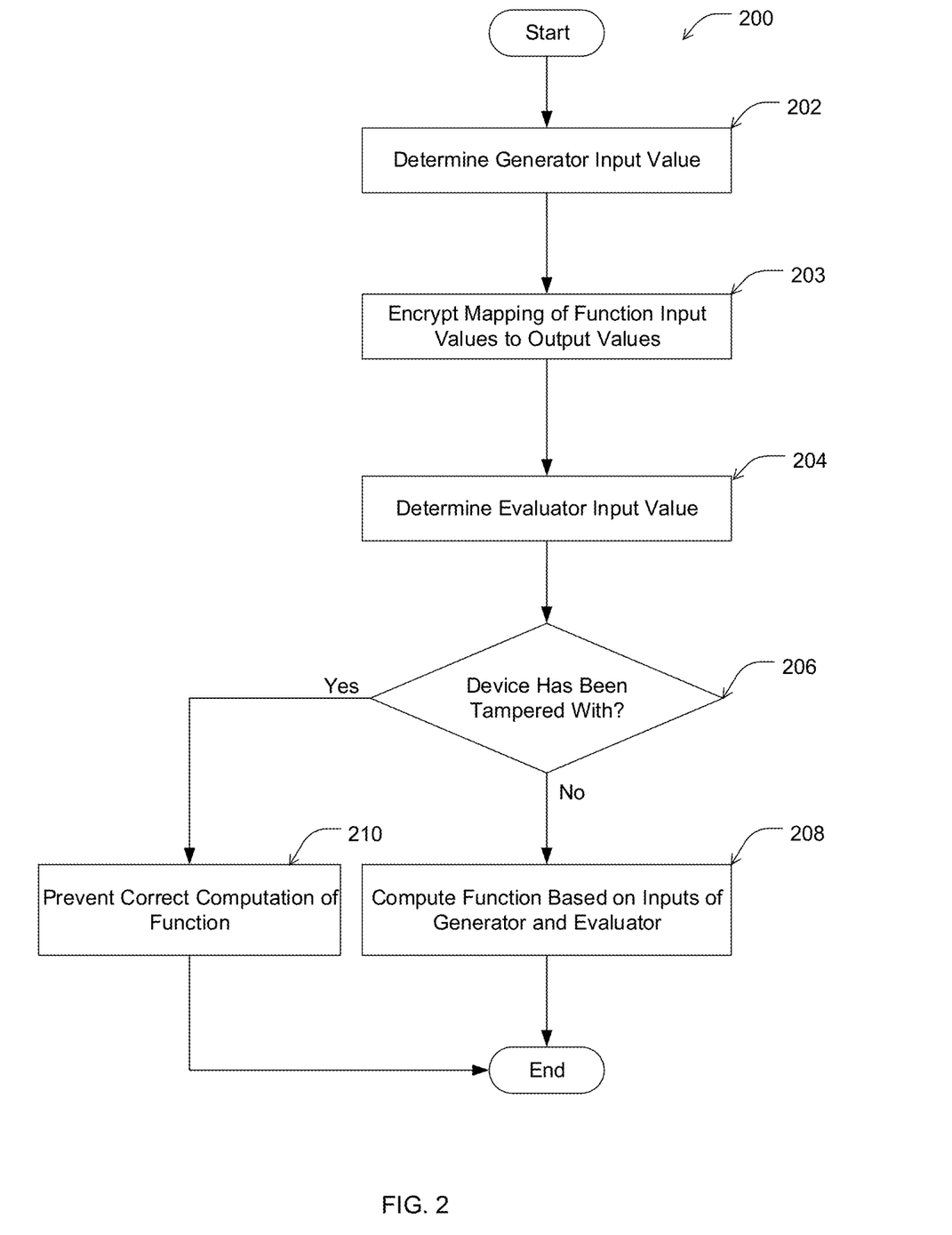
FIG. 2 shows an embodiment of a process for implementing a garbled circuit in a device according to an aspect of the present application.

FIG. 2 illustrates a process 200 by which a garbled circuit is implemented on a single device, according to some embodiments. Process 200 may be executed by device 100 described above with reference to FIG. 1A.

Process 200 begins at block 202, where the system executing process 200 determines a generator input value for a function. In some embodiments, the system may be configured to activate a generator of the garbled circuit in order to determine the generator input value for a function. In some embodiments, the generator may be a software module which the system activates. In some embodiments, the generator may be configured to receive an input value from an external source. For example, a separate application executing on the system may provide a first input value to the generator. In some embodiments, the generator may be configured to generate the input value.

In some embodiments, a received input value may have been encrypted using secret information (e.g., a key). The secret information may have been generated using the tamper resistant module 104 (e.g., a PUF). For example, the input value may be encrypted using a public key that was enrolled by the tamper resistant module 104. In some embodiments, the generator may be configured to obtain the input value by decrypting the received encrypted input value. The generator may recover secret information that can be used to decrypt the input value. In some embodiments, the generator may be configured to provide a stored challenge to the tamper resistant module 104 which, in response, regenerates secret information that the generator can use to decrypt the input value. For example, the tamper resistant module 104 may be configured to regenerate a key that is then used by the generator to decrypt the input value.

Next, process 200 proceeds to block 203, where the generator encrypts a mapping describing a function that is to be evaluated. The mapping may be all or a portion of a truth table specifying output values of a function for various combinations of generator and evaluator input values. For example, the mapping may be output values of a truth table specifying results of a Boolean function (e.g., AND, OR, or NOT operation, or any combination thereof) between different combinations of generator input values and evaluator input values. In some embodiments, the generator may be configured to encrypt the mapping by (1) assigning a key to each generator input value and each evaluator input value in a truth table, and (2) encrypting each of multiple output values of the truth table with keys that correspond to the generator and evaluator input values that result in the output value. The encrypted mapping may also be referred to as a "garbled mapping" or a "garbled circuit."

In some embodiments, the generator may be configured to store an indication of the key corresponding to the generator input value in a memory of the system. The evaluator may evaluate the function by determining the key corresponding to the evaluator input value, and then using the key selected by the generator and the key selected by the evaluator to decrypt the correct output value. For example, if the determined generator input value is a binary value of 1, the generator may store a key assigned to the generator input value of 1 for the evaluator to access. The evaluator may then determine the key value corresponding to the evaluator input value. In some embodiments, the generator may be configured to delete an unencrypted generator input value determined at block 202 from memory after selecting the keys.

Next, process 200 proceeds to block 204 where the system determines an evaluator input value. In some embodiments, the system may be configured to activate the evaluator in order to determine the evaluator input value. For example, the system may activate an evaluator software module. In some embodiments, the evaluator may be configured to receive an input value from an external source. For example, a separate application executing on the system may provide the input to the evaluator. In some embodiments, the evaluator may be configured to generate the input value.

In some embodiments, a received input value may have been encrypted using secret information (e.g., a key). The secret information may have been generated using the tamper resistant module 104 (e.g., a PUF). For example, the input value may be encrypted using a public key that was enrolled by the tamper resistant module 104. In some embodiments, the evaluator may be configured to obtain the input value by decrypting the received encrypted input value by recovering secret information using the tamper resistant module 104. In some embodiments, the evaluator may be configured to provide a stored challenge to the tamper resistant module 104 which, in response, regenerates secret information that the evaluator can use to decrypt the input. For example, the tamper resistant module 104 may be configured to recover a key that is then used by the evaluator to decrypt the input value.

Next, process 200 proceeds to block 206 where it is determined whether the device has been tampered with. In some embodiments, if the device has been tampered with, the tamper resistant module may be prevented from regenerating secret information for decrypting one of the inputs. Tampering with the device may modify physical properties of the tamper resistant module hardware that prevent the tamper resistant module from regenerating enrolled secret information. As a result, the generator is prevented from recovering the secret information, and thus cannot decrypt a received encrypted input value. For example, if the device was tampered with prior to the generator determining the generator input value, the generator would be unable to recover secret information for decrypting a received encrypted input value. In another example, if the device was tampered with prior to the evaluator determining the evaluator input value, the evaluator would be unable to recover secret information for decrypting a received encrypted input value. If either the generator or the evaluator is unable to obtain its respective input value, the device will be prevented from completing correct evaluation of the function for the input values.

If the device was not tampered with, process 200 proceeds to block 208 where the evaluator evaluates the function for the determined generator and evaluator input values. In some embodiments, the evaluator may be configured to identify a set of keys from those stored in the memory by the generator at block 203. The evaluator may then use the set of keys to obtain an output value of the function for the generator input value determined at block 202 and the evaluator input value determined at block 204. In some embodiments, the evaluator may be configured to (1) identify a set of keys stored by the generator at block 203 that correspond to the generator input value and the evaluator input value, and (2) use the set of keys to decrypt an output value of the function encrypted by the generator at block 203. For example, if the generator input value is 1, and the evaluator input value is 1, the evaluator may select keys stored by the generator at block 203 that correspond to the generator input value of 1 and the evaluator input value of 1. The evaluator may then decrypt the encrypted output value that was encrypted at block 203 by the generator using the identified keys. The decrypted output value is the output value of the function for the generator input value determined at block 202 and evaluator input value determined at block 204.

If the device was tampered with, process 200 proceeds to block 210 where the system is prevented from correctly evaluating a value of the function. The tampering may have modified physical properties of the tamper resistant module. As a result, the generator and/or evaluator would be unable to decrypt encrypted input values. If the input values cannot be obtained by the generator and the evaluator, the device is prevented from correctly evaluating the function. If an adversarial entity were to tamper with the device to observe values used in evaluation of the function and/or observe intermediate steps for evaluating the function, the generator and/or evaluator would be prevented from obtaining respective input values, and the function evaluation would not be correctly completed by the device. Accordingly, some embodiments protect the function evaluation from being observed or accessed by an adversarial entity by implementing a garbled circuit.

Below is an example of how a device (e.g., device 100) may evaluate an output of an AND operation between two input bits by implementing a garbled circuit.

1. Generator obtains a truth table for an AND operation between a first value to be determined by the generator (i.e., the generator input value), and a second value to be determined by the evaluator (i.e., the evaluator input value) as shown below in Table 1.

TABLE 1

| First Input | Second Input | Output |
|---|---|---|
| 0 | 0 | 0 |
| 0 | 1 | 0 |
| 1 | 0 | 0 |
| 1 | 1 | 1 |

2. Generator assigns a key to each input value in Table 1 as shown in Table 2.

TABLE 2

| First Input | Second Input |
|---|---|
| L1 | L3 |
| L1 | L4 |
| L2 | L3 |
| L2 | L4 |

3. Generator encrypts each output using the two corresponding input keys to obtain encrypted versions of the output values: $E_{L1,L3}(0)$, $E_{L1,L4}(0)$, $E_{L2,L3}(0)$, and $E_{L2,L4}(1)$
4. Generator determines the generator input value (e.g., as described in reference to block 202 of process 200). If the device was tampered with, the generator will be unable to determine the generator input value, and evaluation of the function will fail.
5. Generator stores the encrypted outputs and the key that correspond to a determined generator input value. For example, when the generator input value is 1, the generator stores the key L2 and the encrypted outputs $E_{L2,L3}(0)$, and $E_{L2,L4}(1)$
6. Evaluator determines the evaluator input value (e.g., as described in reference to block 204 of process 200). If the device was tampered with, the evaluator will be unable to determine the evaluator input value, and evaluation of the function will fail.
7. The evaluator determines the key for the evaluator input value. For example, if the evaluator input value is 1, the evaluator selects a key of L3.
8. The evaluator attempts to decrypt the encrypted outputs stored by the generator using the key corresponding to the generator input value, and the key corresponding to the evaluator input value. For example, if the evaluator input value is 1 the evaluator successfully decrypts $E_{L2,L4}(1)$ using keys L2 and L4 to obtain the output value of 1.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features described in connection with any one or more embodiments are not intended to be excluded from a similar role in any other embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A security device comprising:
   a housing;
   a processor disposed in the housing, the processor configured to implement a garbled circuit including implementing a generator and an evaluator of the garbled circuit; and
   a tamper resistant module connected to the processor, the tamper resistant module configured to generate an output value based on tamper-dependent physical characteristics of the tamper resistant module.

2. The device of claim 1, wherein the processor is configured to implement the garbled circuit to evaluate a function.

3. The device of claim 2, wherein the garbled circuit encrypts evaluation of the function.

4. The device of claim 2, wherein the tamper resistant module is configured to prevent a correct evaluation of the function by the processor when the tamper resistant module has been tampered with.

5. The device of claim 1, wherein the processor is configured to:
   implement the garbled circuit to evaluate a function;
   determine a first input to the function associated with the generator; and
   determine a second input to the function associated with the evaluator.

6. The device of claim 1, wherein the tamper resistant module is configured to enroll a key based on an output value of the tamper resistant module.

7. The device of claim 6, wherein the tamper resistant module is configured to prevent recovery of the key when the tamper resistant module has been tampered with.

8. A method implemented in a self-contained security device, the method comprising:
   implementing, by a processor within the security device, a garbled circuit including implementing a generator and an evaluator of the garbled circuit.

9. The method of claim 8, wherein implementing the garbled circuit comprises evaluating a function.

10. The method of claim 9, wherein implementing the garbled circuit comprises encrypting evaluation of the function.

11. The method of claim 9, further comprising preventing a correct evaluation of the function when a portion of the security device has been tampered with.

12. The method of claim 8, further comprising determining an input of the generator and an input of the evaluator.

13. The method of claim 12, further comprising evaluating a function based on the input of the generator and the input of the evaluator.

14. A security device comprising:
   a housing;
   processing circuitry disposed in the housing and configured to implement a garbled circuit including implementing a generator and an evaluator of the garbled circuit.

15. The device of claim 14, wherein the processing circuitry is configured to implement the garbled circuit to evaluate a function.

16. The device of claim 15, wherein the garbled circuit encrypts evaluation of the function.

17. The device of claim 14, further comprising a tamper resistant module connected to the processing circuitry, the tamper resistant module configured to generate an output based on physical characteristics of the tamper resistant module.

18. The device of claim 1, wherein implementing the generator of the garbled circuit comprises encrypting a mapping describing a function.

19. The method of claim 8, wherein implementing the generator of the garbled circuit comprises encrypting a mapping describing a function.

20. The security device of claim 14, wherein implementing the generator of the garbled circuit comprises encrypting a mapping describing a function.

* * * * *